No. 875,189.
PATENTED DEC. 31, 1907.
A. KUNITZ.
CANDY DIPPING MACHINE.
APPLICATION FILED MAY 21, 1907.
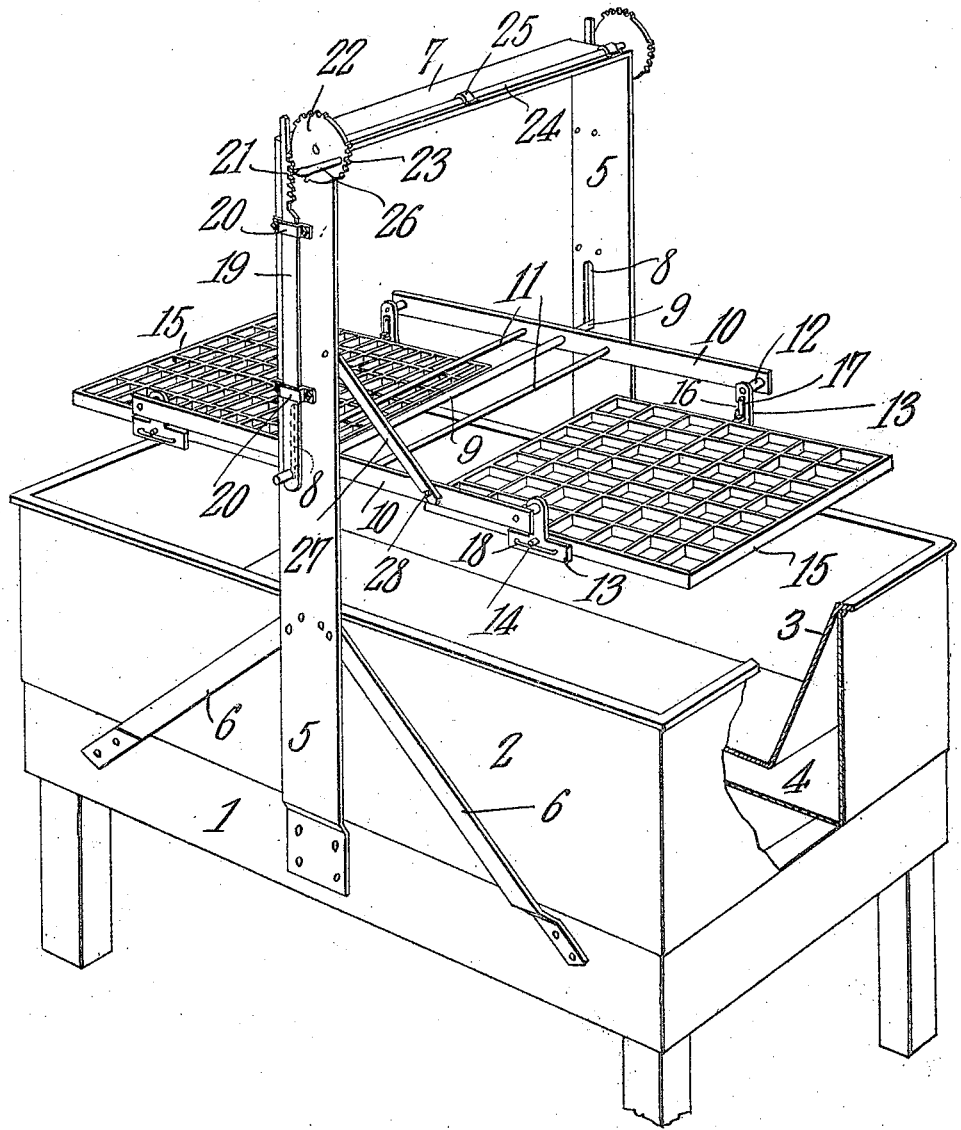
WITNESSES:
Adolph Kunitz,
INVENTOR.
By C. A. Snow & Co.
ATTORNEYS

UNITED STATES PATENT OFFICE.

ADOLPH KUNITZ, OF NORFOLK, NEBRASKA.

CANDY-DIPPING MACHINE.

No. 875,189.  Specification of Letters Patent.  Patented Dec. 31, 1907.

Application filed May 21, 1907. Serial No. 374,861.

*To all whom it may concern:*

Be it known that I, ADOLPH KUNITZ, a citizen of the United States, residing at Norfolk, in the county of Madison and State of Nebraska, have invented a new and useful Candy-Dipping Machine, of which the following is a specification.

This invention has reference to improvements in dipping machines designed more particularly for coating various kinds of confections with chocolate.

The invention is intended more particularly for the purpose of chocolate-coating the cheaper grades of candy.

To this end, the invention consists in a suitable chocolate receptacle, above which is mounted a rotatable carrier for the candy trays, so arranged that the trays may be carried through the chocolate in regular order, and when one of the trays is being dumped and refilled the other tray may be draining. In addition to this, provision is made for subjecting the already dipped confections to jars or shocks which will tend to shake off the surplus chocolate and leave only a thin coating upon the confections.

The invention will be fully understood from the following detailed description taken in connection with the accompanying drawings forming part of this specification, in which,—

The figure represents a perspective view of the improved dipping machine, with parts broken away and other parts shown in section.

Referring to the drawing, there is shown a suitable bench 1 which may be of ordinary construction and needs no particular description. This bench carries a chocolate pan 2 which, as shown, is provided with an interior receptacle 3 between which and the main pan 2 there is left a space 4 for the circulation of steam or hot water by means of which the chocolate compound within the receptacle 3 is maintained in the desired condition of fluidity. The pan 2 will, of course, be provided with suitable inlet and outlet openings for the steam or hot water, but these are not shown in the drawings.

Erected on each side of the bench 1 and extending up alongside of the pan 2 and above the same are two standards 5, secured at their lower ends to the bench 1 and made rigid by means of braces 6. The upper ends of these standards are connected by a cross-piece 7, so that the whole structure is rendered as firm as may be. At a suitable point above the pan 2 the standards are provided with vertical through slots 8 in which is journaled a shaft 9 carrying a frame composed of side bars 10 and connecting brace-rods 11. At the free end of each side bar 10 is an inwardly projecting stud 12, from which hangs a pendent bracket 13 having its lower end expanded so that the entire bracket is in the form of an inverted T.

Mounted in the brackets 13—13 at the corresponding ends of the side bars 10 are pintles 14 projecting from trays 15 about midway of their length. These trays are designed to carry the confections to be treated with chocolate. In the drawing these trays are shown indicatively, without regard to their true structure since such structure may be varied in accordance with the purposes for which the trays are to be used and the structure of these trays constitute no part of the present invention. The trays commonly used for holding various kinds of confections to be chocolate-coated may be used in the machine forming the subject of this present invention.

The brackets 13 of one arm 10 are provided with a side opening 16 through which the corresponding pintle 14 may be removed, and a latch 17 serves to maintain the pintle in its seat in the bracket during the manipulation of the machine. The brackets 13 on the other side bar 10 are provided with staples 18, designed to enter the sides of the trays 15 and hold them from turning on their pintles 14, so that, being pendently supported, the trays will remain horizontal when the side bars 10 are turned about the shaft 9 as an axis. At each end of the shaft 9 in the corresponding standard 5 is a slide 19 held to the corresponding standard 5 by brackets 20 so as to move up and down along said standard, and carrying the corresponding end of the shaft 9 up and down through the length of the corresponding slot 8. The upper end of the slide 19 is formed with rack teeth 21 engaged by teeth on a mutilated gear wheel 22. This gear wheel is provided with three equidistantly spaced sets of gear teeth 23. There are two gear wheels 22 and two slides 19 on each side of the machine, and the gear wheels are mounted on and connected by a shaft 24, held for rotation to the cross-piece 7 by brackets 25. A handle 26 on one of the gear wheels 22 serves to rotate these gear wheels.

In order that the trays may be held in a fixed position so that they are in practically a horizontal plane, there is provided a latch link 27 pivoted at one end to one of the standards 5 and at the other end provided with a notch to engage a pin 28 in the corresponding side bar 10. Any other form of latch device which will hold the side bars 10 from rotation may be used.

Now, let it be supposed that the trays 15 have been properly filled with the confections to be dipped and that the receptacle 3 is suitably filled with the desirable chocolate mixture, kept fluid by means of heat transmitted thereto by steam or hot water within the interior 4 of the pan 2. By uncoupling the latch link 27, one of the trays, say the tray shown in the foreground of the figure, is lowered by turning the side bars 10 around the axis of the shaft 9, thereby elevating the more remote tray so that ultimately it passes through the space between the standards 5, while at the same time the first-named tray is being carried through the chocolate; and then the second tray may be carried through the chocolate, thereby bringing the first tray, with the dipped confections, into the foreground again.

Now, suppose the operation has been continued and the dipped confections have been removed from the tray in the foreground and the latter is filled with undipped confections, and that the more remote tray, already dipped, is ready to be emptied. By again turning the rotary part of the structure on its axis, the more remote tray is brought into the foreground, while the tray with the undipped confections is carried through the chocolate mixture and elevated therefrom until both trays are in the position shown in the drawing. Now, by rotating the gear wheels 22 by means of the handle 26 the trays will be bodily elevated until the gear teeth 23 escape from the rack 21, when the trays will drop by gravity, to be again elevated and dropped and the operation repeated for a third time during one rotation of the gear wheel 22. This will give to the trays a series of shocks which will cause the throwing off of any accumulation of chocolate upon the confections over and above a thin coating thereon. By now locking the side bars 10 against rotation by means of the latch link 27 the tray in the foreground may either be replaced by another tray or by removing the staple 18 the tray may be inverted and the dipped confections thereon deposited on a suitable receptacle placed under this tray above the chocolate, after which the tray may be turned back to its initial position and be again filled with the confections ready for dipping. By this time the confections in the more remote tray have become drained of the surplus chocolate and the chocolate coating has suitably hardened so that the dipped confections may be safely handled.

I claim:—

1. In a chocolate dipping machine, a rotatable carrier, confection-holding trays pendently supported therefrom and independently rotatable in the pendent supports, and means for locking the trays against independent rotation in their supports.

2. A chocolate dipping machine comprising a rotatable carrier, confection trays pendently supported therefrom and capable of being independently rotated in the pendent supports, and a staple lock for holding said trays against independent rotation in their supports.

3. In a chocolate dipping machine, a rotatable carrier, confection trays pendently supported therefrom and removable from the pendent supports, and locks on the pendent supports for maintaining the trays in operative relation to the supports.

4. In a chocolate dipping machine, confection trays, supports therefor, and means for removing surplus chocolate from the dipped confections comprising vertically movable carrier for the tray supports provided with gear teeth, and mutilated gears acting thereon to elevate and then release the supports.

5. A chocolate dipping machine comprising a chocolate receptacle, a rotatable carrier in operative relation to said receptacle, pendently-hung confection trays on said carrier, and means for imparting shocks or jars to said trays comprising supports for the carrier having gear teeth formed on one end, and mutilated gears engaging said teeth and alternately elevating the carrier and permitting it to fall.

In testimony that I claim the foregoing as my own, I have hereto affixed my signature in the presence of two witnesses.

ADOLPH KUNITZ.

Witnesses:
  WILLIAM STOKES,
  J. E. HAASE.